United States Patent [19]
Pandey et al.

[11] Patent Number: 4,680,280
[45] Date of Patent: Jul. 14, 1987

[54] SULFUR TOLERANCE OF ZEOLITIC REFORMING CATALYSTS

[75] Inventors: Sue D. Pandey, Berkeley; Waldeen C. Buss, Kensington, both of Calif.

[73] Assignee: Chevron Research Company, San Francisco, Calif.

[21] Appl. No.: 712,584

[22] Filed: Mar. 15, 1985

[51] Int. Cl.$^4$ .......................... B01J 29/06; B01J 29/12
[52] U.S. Cl. .......................................... 502/66; 502/74
[58] Field of Search ..................... 502/66, 74; 208/138

[56] References Cited

U.S. PATENT DOCUMENTS

| | | | |
|---|---|---|---|
| 3,714,029 | 1/1973 | Berry | 208/138 X |
| 3,914,330 | 10/1975 | Hughes | 208/138 |
| 4,077,909 | 3/1978 | Bertolacini et al. | 208/138 X |
| 4,120,825 | 10/1978 | Ward | 502/66 X |
| 4,124,487 | 11/1978 | Tsybulevsky et al. | 502/66 X |
| 4,221,677 | 9/1980 | Vasalos et al. | 502/66 X |
| 4,309,277 | 1/1982 | O'Hara et al. | 502/66 X |
| 4,325,808 | 4/1982 | Kim et al. | 502/66 X |
| 4,517,306 | 5/1985 | Buss | 502/74 |

Primary Examiner—Carl F. Dees
Attorney, Agent, or Firm—S. R. LaPaglia; W. K. Turner; T. G. DeJonghe

[57] ABSTRACT

A reforming catalyst comprising a large-pore zeolite and at least one reforming catalytic metal selected from the group consisting of the Group VIII noble metals, having enhanced sulfur tolerance achieved by adding at least one desulfurization metal to the catalyst; and a reforming process having high selectivity for dehydrocyclization which comprises contacting a naphtha boiling in the gasoline boiling range and containing some acyclic hydrocarbons with the foregoing catalyst.

16 Claims, 1 Drawing Figure

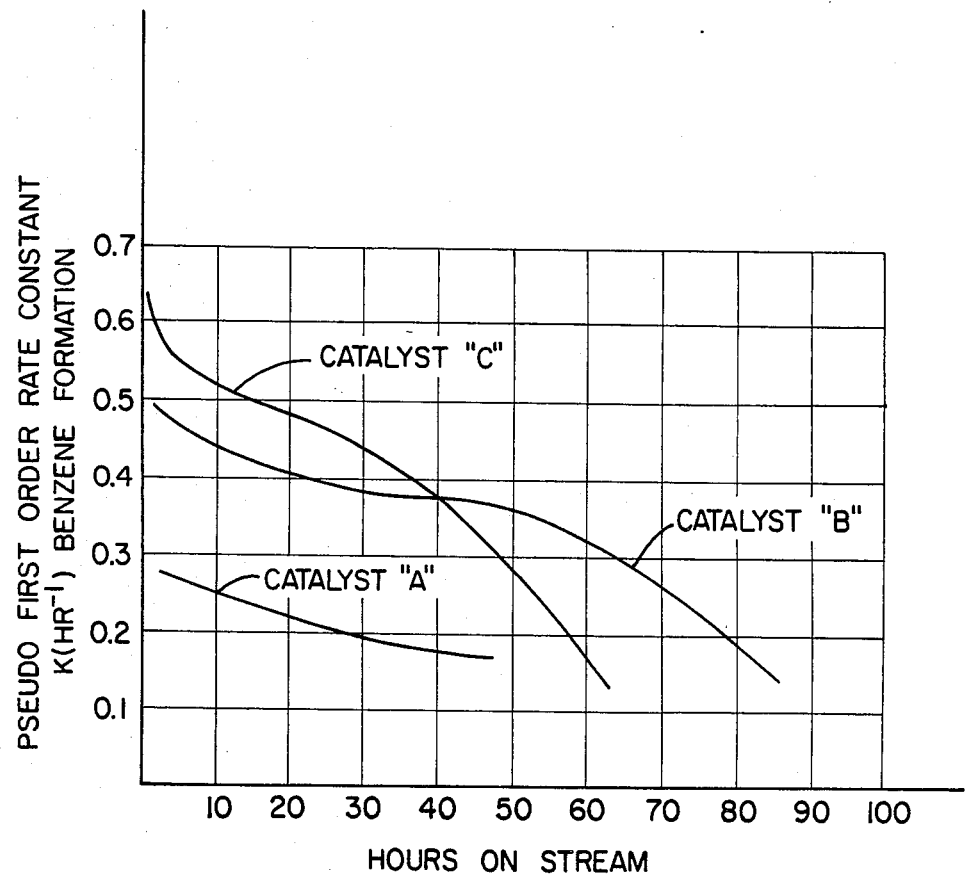

SULFUR TOLERANCE OF ZEOLITIC REFORMING CATALYSTS

BACKGROUND OF THE INVENTION

The present invention relates to the introduction of a desulfurization metal into select zeolitic reforming catalysts to improve the sulfur tolerance of the catalysts. In particular, the present invention provides a way to delay the onset and slow the rate of sulfur poisoning of certain unexpectedly sulfursensitive zeolite-based reforming catalysts. The select reforming catalysts which are improved by the introduction of a desulfurization metal are characterized by a largepore zeolite and a Group VIII catalytic reforming metal.

U.S. Pat. No. 4,104,320 issued to Bernard et al. on Aug. 1, 1978, describes a dehydrocyclization process in which aliphatic hydrocarbons are contacted in the presence of hydrogen with a reforming catalyst consisting essentially of a type L-zeolite having exchangeable cations of which at least 90% are alkali metal ions selected from the group consisting of ions of lithium, sodium, potassium, rubidium and cesium and containing at least one metal selected from the group which consists of metals of Group VIII of the Periodic Table of Elements, tin and germanium. At least one of the metals must have a dehydrogenating effect, so as to convert at least part of the feedstock into aromatic hydrocarbons.

A particularly advantageous embodiment of this method is a platinum/alkali metal/type L-zeolite catalyst containing cesium or rubidium because of its excellent activity and selectivity for converting hexanes and heptanes to aromatics. However, these catalysts are considered by most refiners to be too unstable for commercial use.

Accordingly, U.S. Pat. No. 4,447,316 issued to Buss on May 8, 1984 suggests improving the stability of reforming catalysts comprising L-zeolite charged by the introduction of a Group VIII metal by introducing an alkaline earth metal selected from barium, strontium, or calcium (preferably barium). The resulting more stable catalyst is suggested as an especially useful dehydrocyclization catalyst. For instance, U.S. Pat. No. 4,435,283 issued to Buss and Hughes on Mar. 6, 1984; U.S. Pat. No. 4,443,326 issued to Field on Apr. 17, 1984; and U.S. Pat. No. 4,456,527 issued to Buss, Field, and Robinson on June 26, 1984 disclose various reforming processes advantageously using the highly selective dehydrocyclization catalyst disclosed in U.S. Pat. No. 4,447,316.

In fact, aromatics are produced by several reaction paths which occur simultaneously during reforming. The more important reactions include dehydrogenation of cyclohexanes to aromatics, dehydroisomerization of alkylcyclopentanes to aromatics, and dehydrocyclization of acyclic hydrocarbons to aromatics.

The dehydrogenation of cyclohexane and alkylcyclohexanes to benzene and alkylbenzenes is the most thermodynamically favored of the aromatization reactions. This means that dehydrogenation of cyclohexanes can yield a higher ratio of aromatic product to nonaromatic reactant than either of the other two types of aromatization reactions at a given reaction temperature and pressure. Moreover, the dehydrogenation of cyclohexanes is the fastest of the three aromatization reactions.

As a consequence of these thermodynamic and kinetic considerations, the selectivity for the dehydrogenation of cyclohexanes is higher than that for dehydroisomerization or dehydrocyclization. Dehydroisomerization of alkylcyclopentanes is somewhat less favored, both thermodynamically and kinetically. Its selectivity, although generally high, is lower than that for dehydrogenation. Dehydrocyclization of paraffins is the least favored both thermodynamically and kinetically. In conventional reforming, its selectivity is much lower than that for the other two aromatization reactions.

The selectivity disadvantage of paraffin dehydrocyclization is particularly large for the aromatization of compounds having a small number of carbon atoms per molecule. Dehydrocyclization selectivity in conventional reforming is very low for $C_6$ hydrocarbons. It increases with the number of carbon atoms per molecule, but remains substantially lower than the aromatization selectivity for dehydrogenation or dehydroisomerization of naphthenes having the same number of carbon atoms per molecule. A major improvement in the catalytic reforming process required, above all else, a drastic improvement in dehydrocyclization selectivity that can be achieved while maintaining adequate catalyst activity and stability. Accordingly, it was the primary object of the invention disclosed in U.S. Pat. No. 4,447,316 to provide a reforming catalyst and process which could be used to improve the octane rating and yield of products in the gasoline boiling range.

It follows that catalysts which are used in successful reforming processes must have good selectivity, i.e., be able to produce high yield of liquid product in the gasoline boiling range containing large concentrations of high octane number aromatics, and conversely produce low yields of light gaseous hydrocarbons. Additionally, the catalysts should have good activity and stability. Catalysts comprising a Group VIII noble metal, usually platinum, were widely known and used in reforming processes.

Thus, at the time U.S. Pat. No. 4,447,316 issued the state of the reforming art was well developed with several clearly identified areas for improvement. In particular, it was a major goal of reforming process research to develop a catalyst with improved dehydrocyclization selectivity that can be achieved while maintaining acceptable catalyst activity and stability. U.S. Pat. No. 4,447,316 provides a catalyst comprising a large-pore zeolite, an alkaline earth metal selected from barium, strontium, or calcium, and a Group VIII metal which gives superior dehydrocyclization selectivity.

However, at the time U.S. Pat. No. 4,443,326 issued it was also well known that reforming catalysts were poisoned by exposure to sulfur. Conventional catalysts comprising Group VIII catalytic reforming metals were protected by controlling the sulfur concentration of the hydrocarbon feed by catalytic hydrodesulfurization in a first stage, and by using a sulfur-sorbing feed treatment. U.S. Pat. No. 4,456,527 which issued on June 26, 1984 to Waldeen C. Buss, Leslie A. Field and Richard C. Robinson discusses this problem and discloses that a lack of stability due to sulfur sensitivity is a surprisingly acute problem when the catalyst comprises a large-pore zeolite. In fact, the sulfur levels required when using such a catalyst are an order of magnitude or more below the levels permissible for even the most sulfur-sensitive conventional reforming catalysts. The importance of sulfur control is further magnified by the fact that known methods of recovering from sulfur upsets are inadequate to remove sulfur from a largepore zeolite reforming catalyst, particularly if the zeolite is a type L-zeolite.

U.S Pat. No. 4,456,527 suggests various sulfur removal systems that can be used to reduce the sulfur concentration of the hydrocarbon feed to below 500 ppb., including (a) passing the hydrocarbon feed over a suitable metal or metal oxide, for example copper, on a suitable support, such as alumina or clay, at low temperatures in the range of 200° F. to 400° F. in the absence of hydrogen; (b) passing a hydrocarbon feed, in the presence or absence of hydrogen, over a suitable metal or metal oxide, or combination thereof, on a suitable support at medium temperatures in the range of 400° F. to 800° F.; (c) passing a hydrocarbon feed over a first reforming catalyst, followed by passing the effluent over a suitable metal or metal oxide on a suitable support at high temperatures in the range of 800° F. to 1000° F.; (d) passing a hydrocarbon feed over a suitable metal or metal oxide and a Group VIII metal on a suitable support at high temperatures in the range of 800° F. to 1000° F.; and (e) combining the above systems. Additional sulfur removal from the recycle gas can be achieved by conventional methods used in combination with the above sulfur removal systems.

Methods which remove sulfur from the hydrocarbon feed prior to contacting the reforming catalyst address the sulfur sensitivity problem by altering the environment of the reforming process rather than by improving the tolerance of the catalyst per se. Thus, in instances where the hydrocarbon feed contains such large concentrations of sulfur, such that some sulfur will pass through the feed treatment, the stability of the catalyst remains a problem. The present invention improves the sulfur tolerance of large-pore zeolite reforming catalysts, especially those comprising a Group VIII catalytic metal.

SUMMARY OF THE INVENTION

The sulfur tolerance of a large-pore zeolite reforming catalyst containing a Group VIII catalytic metal can be improved by adding to the catalyst a desulfurization metal. This discovery is based upon observations of the behavior of catalyst comprising molybdenum and the consequent theory that the added desulfurization metal acts as a sulfur trap, reacting with sulfur to prevent it from reaching the catalytic metal until the desulfurization metal is saturated.

BRIEF DESCRIPTION OF THE DRAWING

The FIGURE accompanying the following Detailed Description of the Invention graphically illustrates the effect of an added desulfurization metal to a representative large-pore zeolite reforming catalyst comprising a Group VIII catalytic metal. As illustrated, the presence of the desulfurization metal delays the onset and slows the rate of sulfur poisoning.

DETAILED DESCRIPTION OF THE INVENTION

As previously stated, the object of the present invention is to improve the sulfur tolerance of large-pore zeolite reforming catalysts, especially those comprising a Group VIII catalytic metal. This object is achieved by adding to the catalyst a desulfurization metal. As used herein the term "desulfurization metal" refers to metals which when added to the catalyst, as hereinafter described, react with the sulfur present in reforming feeds to prevent the sulfur from reaching the catalytic metal and poisoning the catalyst. Accordingly, to be effective, the desulfurization metals must react with sulfur more rapidly than the catalytic metal reacts with sulfur. The primary catalytic metals used in reforming catalysts, referred to herein as "catalytic metals", are selected from the Group VIII noble metals, namely, ruthenium, rhenium, palladium, rhodium, platinum, iridium, and osmium. Platinum with and without rhenium has long been the preferred catalytic metal because of its high activity and unique selectivity characteristics. Thus, as a generality, the desulfurization metals effective in the present invention are more reactive with sulfur than platinum under the conditions encountered in reforming operations.

The effectiveness of the desulfurization metals can theoretically be attributed to several factors. The desulfurization metals are effective if they are more reactive than the catalytic metal with the sulfur species to form a stable compound. Representative desulfurization metals suitable for use in the present invention include the Group VIB metals, namely, chromium, molybdenum, and tungsten. These metals alone and especially in combination have been used to catalyze hydrodesulfurization reactions and, although less active than Group VIII reforming catalytic metals, have hydrogenation activity in the presence of sulfur compounds.

Hydrogenolysis has been regarded as an undesirable reaction in reforming operations since it results in the formation of light products boiling outside of the gasoline boiling range and consumes hydrogen. It is therefore not surprising that previous efforts to improve catalysts used in reforming operations have been directed to catalysts which minimize hydrogenolysis activity. Moreover, molecules containing elements of Group VIB, especially the heavier elements are regarded as poisons for conventional reforming catalysts. As a consequence, the improved sulfur tolerance imparted by the addition of a desulfurization metal to a reforming catalyst has not been recognized. In fact, the prior art, for example, U.S. Pat. No. 4,456,527 suggests that a separate hydrodesulfurization operation should be carried out to reduce the sulfur content of reforming feeds prior to the reforming operation.

The addition of a desulfurization metal to improve the sulfur tolerance of reforming catalyst is advantageous when the reforming catalyst is a large-pore zeolite charged with one or more catalytic metals. As mentioned above, these catalysts are particularly sensitive to sulfur. The term "large-pore zeolite" is accepted by the art as a zeolite having an effective pore diameter of 6 to 15 Angstroms (Å).

Among the large-pored crystalline zeolites which have been found to be useful in the practice of the present invention, type L-zeolite, zeolite X, zeolite Y and faujasite are the most important and have apparent pore sizes on the order of 7 to 9 Angstroms.

The chemical formula for zeolite Y expressed in terms of mole oxides may be written as:

$$(0.7-1.1)Na_2O:Al_2O_3:xSiO_2:yH_2O$$

wherein x is a value greater than 3 up to about 6 and y may be a value up to about 9. Zeolite Y has a characteristic X-ray powder diffraction pattern which may be employed with the above formula for identification. Zeolite Y is described in more detail in U.S. Pat. No. 3,130,007. U.S. Pat. No. 3,130,007 is hereby incorporated by reference to show a zeolite useful in the present invention.

Zeolite X is a synthetic crystalline zeolitic molecular sieve which may be represented by the formula:

$$(0.7-1.1)M_{2/n}O:Al_2O_3:(2.0-3.0)SiO_2:yH_2O$$

wherein M represents a metal, particularly alkali and alkaline earth metals, n is the valence of M, and y may have any value up to about 8 depending on the identity of M and the degree of hydration of the crystalline zeolite. Zeolite X, its X-ray diffraction pattern, its properties, and method for its preparation are described in detail in U.S. Pat. No. 2,882,244. U.S. Pat. No. 2,882,244 is hereby incorporated by reference to show a zeolite useful in the present invention.

The preferred catalyst according to the invention is a type L-zeolite charged with one or more dehydrogenating constituents.

Type L-zeolites are synthetic zeolites. A theoretical formula is $M_{9/n}[(AlO_2)_9(SiO_2)_{27}]$ in which M is a cation having the valency n.

The real formula may vary without changing the crystalline structure; for example, the mole ratio of silicon to aluminum (Si/Al) may vary from 1.0 to 3.5.

Although there are a number of cations that may be present in zeolite L, in one embodiment, it is preferred to synthesize the potassium form of the zeolite, i.e., the form in which the exchangeable cations present are substantially all potassium ions. The reactants accordingly employed are readily available and generally water soluble. The exchangeable cations present in the zeolite may then conveniently be replaced by other exchangeable cations, as will be shown below, thereby yielding isomorphic form of zeolite L.

In one method of making zeolite L, the potassium form of zeolite L is prepared by suitably heating an aqueous metal aluminosilicate mixture whose composition, expressed in terms of the mole ratios of oxides, falls within the range:

$K_2O/(K_2O+Na_2O)$: from about 0.33 to about 1
$(K_2O+Na_2O)/SiO_2$: from about 0.35 to about 0.5
$SiO_2/Al_2O_3$: from about 10 to about 28
$H_2O/(K_2O+Na_2O)$: from about 15 to about 41

The desired product is hereby crystallized out relatively free from zeolites of dissimilar crystal structure.

The potassium form of zeolite L may also be prepared in another method along with other zeolitic compounds by employing a reaction mixture whose composition, expressed in terms of mole ratios of oxides, falls within the following range:

$K_2O/(K_2O+Na_2O)$: from about 0.26 to about 1
$(K_2O+Na_2O)/SiO_2$: from about 0.34 to about 0.5
$SiO_2/Al_2O_3$: from about 15 to about 28
$H_2O/(K_2O+Na_2O)$: from about 15 to about 51

It is to be noted that the presence of sodium in the reaction mixture is not critical to the present invention.

When the zeolite is prepared from reaction mixtures containing sodium, sodium ions are generally also included within the product as part of the exchangeable cations together with the potassium ions. The product obtained from the above ranges has a composition, expressed in terms of moles of oxides, corresponding to the formula:

$$0.9-1.3[(1-x)K_2O, xNa_2O]:Al_2O_3:5.2-6.9SiO_2:yH_2O$$

wherein "x" may be any value from 0 to about 0.75 and "y" may be any value from 0 to about 9.

In making zeolite L, representative reactants are activated alumina, gamma alumina, alumina trihydrate and sodium aluminate as a source of alumina. Silica may be obtained from sodium or potassium silicate, silica gels, silicic acid, aqueous colloidal silica sols and reactive amorphous solid silicas. The preparation of typical silica sols which are suitable for use in the process of the present invention are described in U.S. Pat. No. 2,574,902 and U.S. Pat. No. 2,597,872. Typical of the group of reactive amorphous solid silicas, preferably having an ultimate size of less than 1 micron, are such materials as fume silicas, chemically precipitated and precipitated silica sols. Potassium and sodium hydroxide may supply the metal cation and assist in controlling pH.

In making zeolite L, the usual method comprises dissolving potassium or sodium aluminate and alkali, viz., potassium or sodium hydroxide, in water. This solution is admixed with a water solution of sodium silicate, or preferably with a water-silicate mixture derived at least in part from an aqueous colloidal silica sol. The resultant reaction mixture is placed in a container made, for example, of metal or glass. The container should be closed to prevent loss of water. The reaction mixture is then stirred to insure homogeneity.

The zeolite may be satisfactorily prepared at temperatures of from about 90° C. to 200° C. the pressure being atmospheric or at least that corresponding to the vapor pressure of water in equilibrium with the mixture of reactants at the higher temperature. Any suitable heating apparatus, e.g., an oven, sand bath, oil bath or jacketed autoclave, may be used. Heating is continued until the desired crystalline zeolite product is formed. The zeolite crystals are then filtered off and washed to separate them from the reactant mother liquor. The zeolite crystals should be washed, preferably with distillated water, until the effluent wash water, in equilibrium with the product, has a pH of between about 9 and 12. As the zeolite crystals are washed, the exchangeable cation of the zeolite may be partially removed and is believed to be replaced by hydrogen cations. If the washing is discontinued when the pH of the effluent wash water is between about 10 and 11, the $(K_2O+Na_2O)Al_2O_3$ molar ratio of the crystalline product will be approximately 1.0. Thereafter, the zeolite crystals may be dried, conveniently in a vented oven.

Zeolite L has been characterized in "Zeolite Molecular Sieves" by Donald W. Breck, John Wiley & Sons, 1974, as having a framework comprising 18 tetrahedra unit cancrinite-type cages linked by double 6-rings in columns and crosslinked by single oxygen bridges to form planar 12-membered rings. These 12-membered rings produce wide channels parallel to the c-axis with no stacking faults. Unlike erionite and cancrinite, the cancrinite cages are symmetrically placed across the double 6-ring units. There are four types of cation locations: (a) in the double 6-rings, (b) in the cancrinite-type cages, (c) between the cancrinite-type cages, and (d) on the channel wall. The cations in site (d) appear to be the only exchangeable cations at room temperature. During dehydration, cations in site (d) probably withdraw from the channel walls to a fifth site, site (e), which is located between the (a) sites. The hydrocarbon sorption pores are approximately 7 to 8 Angstroms in diameter.

A more complete description of these zeolites is given, e.g., in U.S. Pat. No. 3,216,789 which, more particularly, gives a conventional description of these zeolites. U.S. Pat. No. 3,216,789 is hereby incorporated by reference to show as type L-zeolite useful in the present invention.

Zeolite L differs from other large pore zeolites in a variety of ways besides X-ray diffraction pattern.

One of the most pronounced differences is in the channel system of zeolite L. Zeolite L has a one-dimensional channel system parallel to the c-axis, while most other zeolites have either two-dimensional or three-dimensional channel systems. Zeolite A, X and Y all have three-dimensional channel systems. Mordenite (Large Port) has a major channel system parallel to the c-axis, and another very restricted channel system parallel to the b-axis. Omega zeolite has a one-dimensional channel system.

Another pronounced difference is in the framework of the various zeolites. Only zeolite L has cancrinite-type cages linked by double-six rings in columns and crosslinked by oxygen bridges to form planar 12-rings. Zeolite A has a cubic array of truncated octahedra, beta-cages, linked by double-four ring units. Zeolites X and Y both have truncated octahedra, beta-cages, linked tetrahedrally through double-six rings in an arrangement like carbon atoms in a diamond. Mordenite has complex chains of five-rings crosslinked by four-ring chains. Omega has a fourteen-hedron of gmelinite-type linked by oxygen bridges in columns parallel to the c-axis.

Presently, it is not known which of these differences, or other differences, is responsible for the high selectivity for dehydrocyclization of catalysts made from zeolite L, but it is known that catalysts made of zeolite L do react differently than catalysts made of other zeolites.

Various factors have an effect on the X-ray diffraction pattern of a zeolite. Such factors include temperature, pressure, crystal size, impurities, and type of cations present. For instance, as the crystal size of the type L-zeolite becomes smaller, the X-ray diffraction pattern becomes broader and less precise. Thus, the term "zeolite L" includes any zeolites made up of cancrinite cages having an X-ray diffraction pattern substantially similar to the X-ray diffraction patterns shown in U.S. Pat. No. 3,216,789.

Type L-zeolites are conventionally synthesized largely in the potassium form, i.e., in the theoretical formula given previously, most of the M cations are potassium. The M cations are exchangeable, so that a given type L-zeolite, e.g., a type L zeolite in the potassium form, can be used to obtain type L-zeolites containing other cations, but subjecting the type L zeolite to ion exchange treatment in an aqueous solution of appropriate salts. However, it is difficult to exchange all of the original cations, e.g., potassium, since some exchangeable cations in the zeolite are in sites which are difficult for the reagents to reach.

As mentioned above, the reforming catalysts improved according to the present invention are charged with one or more Group VIII catalytic metals, e.g., ruthenium, rhodium, palladium, iridium or platinum.

The preferred Group VIII metals are iridium, palladium, and particularly platinum, which are more selective with regard to dehydrocyclization and are also more stable under the dehydrocyclization reaction conditions than other Group VIII metals.

The preferred percentage of platinum in the catalyst is between 0.1% and 5%, more preferably from 0.1% to 1.5%.

Catalytic metals are introduced into the zeolite by synthesis, impregnation or exchange in an aqueous solution of an appropriate salt. When it is desired to introduce two catalytic metals into the zeolite, the operation may be carried out simultaneously or sequentially.

By way of example, platinum can be introduced by impregnating the zeolite with an aqueous solution of tetrammineplatinum (II) nitrate, tetrammineplatinum (II) hydroxide, dinitrodiamino-platinum or tetrammine-platinum (II) chloride. In an ion exchange process, platinum can be introduced by using cationic platinum complexes such as tetrammineplatinum (II) nitrate.

At least one desulfurization metal is essential to the improved large-pore zeolite catalysts of the present invention. The desulfurization metal can be added before or after or simultaneously with the catalytic metal, and in essentially the same manner as the catalytic metal. The concentration of the desulfurization metal relative to the catalytic metal expressed as the mole ratio of metals can vary from as high as 50 to 1 (catalytic metal to desulfurization metal) to as low as 1 to 1. An essentially direct increase in catalyst life expectancy in the presence of sulfur is expected as the mole ratio is lowered. The mole ratio will preferably be from about 20 to 1 to about 5 to 1. However, there may be reforming operations which can withstand lower mole ratios of catalytic metal to desulfurization metal. Accordingly, while the mole ratios cited above provide general guidance they are not intended to be optimums. Each reforming operation, and particularly the sulfur concentration of the feed, will have a unique optimum which can be readily identified.

It has been found that if the zeolite is impregnated with the catalytic metal before being impregnated with the desulfurization metal, the resulting catalyst may have a lower starting activity than the same initial catalyst without the desulfurization metal. Thus, a preferred embodiment of an improved reforming catalyst according to the present invention is prepared by impregnating a large-pore zeolite such as L-zeolite with an oxide of the desulfurization metal, such as a molybdenum tetraoxide ammonia salt. Then calcining and impregnating the zeolite containing the desulfurization metal with a catalytic metal to obtain a final catalyst metal to desulfurization metal mole ratio of about 12 to 1.

For use as a reforming catalyst it will be desirable to shape the large-pore zeolite into catalytic pellets. This can be done either before or after the metals are deposited, but usually shaping is carried out before the metals are deposited. An inorganic oxide can be used as a carrier to bind the zeolite to give the catalyst additional strength. The carrier can be a natural or synthetically produced inorganic oxide or combination of inorganic oxides. Preferred loadings of inorganic oxide are from 0% to 40% by weight of the catalyst. Typical inorganic oxide supports which can be used include aluminosilicates (such as clays), alumina, and silica, in which acidic sites are preferably exchanged by cations which do not impart strong acidity.

One preferred inorganic oxide support is alumina. Another preferred support is "Ludox", which is a colloidal suspension of silica in water, stabilized with a small amount of alkali.

When an inorganic oxide is used as a carrier, there are three preferred methods by which the catalyst can be made, although other methods could be used.

In the first preferred method, the zeolite is made, then the zeolite is impregnated with a desulfurization metal, dried and calcined, impregnated with a catalytic metal, calcined and then mixed with the inorganic oxide and extruded through a die to form cylindrical pellets, then the pellets are calcined. Advantageous methods of separating the zeolite from the metal solutions are by a batch centrifuge or a pressed filter. In this embodiment all of the metals are incorporated on the zeolite and none are incorporated on the inorganic oxide. It has the disadvantage that the large-pore zeolite is hard to separate from the metal solutions.

In the second preferred method, the large-pore zeolite is mixed with the inorganic oxide and extruded through the die to form cylindrical pellets, then these pellets are calcined and then impregnated with a desulfurization metal, separated from solution, impregnated with a catalytic metal, separated from the solution, and calcined. This embodiment has the advantage that the pellets are easy to separate from the solutions.

In a third preferred method, the zeolite is dried and calcined, mixed with the inorganic oxide and extruded through the die to form cylindrical pellets, then these pellets are calcined and impregnated with first the desulfurization metal then the catalytic metal, separated from the solution, and calcined.

In the extrusion of large-pore zeolites, various extrusion aids and pore formers can be added. Examples of suitable extrusion aids are ethylene glycol and stearic acid. Examples of suitable pore formers are wood flour, cellulose and polyethylene fibers.

After the desired desulfurization metal(s) and catalytic metal(s) have been introduced, the catalyst is treated in air at about 260° C. and then reduced in hydrogen at temperatures of from 200° C. to 700° C., preferably 200° C. to 620° C.

At this stage the catalyst is ready for use in a reforming process. However, as disclosed in U.S. Pat. No. 4,435,283 issued Mar. 6, 1984 to Waldeen C. Buss and Thomas R. Hughes; U.S. Pat. No. 4,443,326 mentioned previously; U.S. Pat. No. 4,447,316 issued May 8, 1984 to Waldeen C. Buss; and U.S. Pat. No. 4,456,527 also mentioned previously (all of which are incorporated herein by reference), it is advantageous to incorporate an alkaline earth metal into a large-pore zeolite reforming catalyst comprising a Group VIII catalyst metal. Thus, in a preferred embodiment of the present invention an alkaline earth metal is present in the catalyst. That alkaline earth metal must be either barium, strontium or calcium. Preferably the alkaline earth metal is barium. The alkaline earth metal can be incorporated into the zeolite by synthesis, impregnation or ion exchange. Barium is preferred to the other alkaline earths because the resulting catalyst has high activity, high selectivity and high stability.

In one embodiment, at least part of the alkali metal of the zeolite is exchanged with barium, using techniques known for ion exchange of zeolites. This involves contacting the zeolite with a solution containing excess Ba ions. The barium should preferably constitute from 0.1% to 35% of the weight of the zeolite, more preferably from 5% to 15% by weight.

As detailed above in their broadest aspects, the catalysts of the present invention comprise a large-pore zeolite, a catalytic metal or metals and a desulfurization metal or metals. Such catalysts when used in a reforming process, especially a dehydrocyclization process, demonstrate high selectivity and as a result of their unique composition enhanced sulfur tolerance.

In order to obtain optimum selectivity, the reforming temperature should be adjusted so that reaction rate is appreciable, but conversion is less than 98%, as excessive temperature and excess reaction can have an adverse affect on selectivity. Pressure should also be adjusted within a proper range. Too high a pressure will place a thermodynamic (equilibrium) limit on the desired reaction, and too low a pressure may result in coking and deactivation.

Regarding the feedstock used in the present invention, it is a naphtha boiling in the gasoline range, containing at least some acyclic hydrocarbons.

According to the present invention, the hydrocarbon feed is contacted with the catalyst in a reforming zone maintained at reforming conditions. This contacting may be accomplished by using the catalyst in a fixed bed system, a moving bed system, a fluidized system, or in a batch-type operation; however, in view of the danger of attrition losses of the valuable catalyst and of well-known operational advantages, it is preferred to use either a fixed bed system or a dense-phase moving bed system. It is also contemplated that the contacting step can be performed in the presence of a physical mixture of particles of a conventional dual-function catalyst of the prior art. In a fixed bed system, the hydrocarbon feed is preheated by any suitable heating means to the desired reaction temperature and then passes into a reforming zone containing a fixed bed of the catalyst. It is, of course, understood that the zone may be one or more separate reactors with suitable means therebetween to ensure that the desired conversion temperature is maintained at the entrance to each reactor. It is also important to note that the reactants may be contacted with the catalyst bed in either upward, downward, or radial flow fashion. In addition, the reactants may be in a liquid phase, a mixed liquid-vapor phase, or a vapor phase when they contact the catalyst, with best results obtained in the vapor phase. The reforming system then preferably comprises a zone containing one or more fixed beds or dense-phase moving beds of the catalyst. In a multiple bed system, it is, of course, within the scope of the present invention to use the present catalyst in less than all of the beds with a conventional dual-function catalyst being used in the remainder of the beds. The reforming zone may be one or more separate reactors with suitable heating means therebetween to compensate for the endothermic nature of the reforming reactions that takes place in each catalyst bed.

Although hydrogen is the preferred diluent for use in the reforming process, in some cases other art-recognized diluents may be advantageously utilized, either individually or in admixture with hydrogen, such as $C_1$ to $C_5$ paraffins such as methane, ethane, propane, butane and pentane; the like diluents, and mixtures thereof. Hydrogen is preferred because it serves the dual function of not only lowering the partial pressure of the hydrocarbon feed, but also of suppressing the formation of hydrogen-deficient, carbonaceous deposits (commonly called coke) on the catalytic composite. Ordinarily, hydrogen is utilized in amounts sufficient to insure a hydrogen to hydrocarbon mole ratio of about 0 to about 20:1, with best results obtained in the range of about 2:1 to about 6:1. The hydrogen charged to the reforming zone will typically be contained in a hydrogen-rich gas stream recycled from the effluent stream from this zone after a suitable gas/liquid separation step.

Reforming generally results in the production of hydrogen. Thus, exogenous hydrogen need not necessarily be added to the reforming system except for pre-reduction of the catalyst and when the feed is first introduced. Generally, once reforming is underway, part of the hydrogen produced is recirculated over the catalyst. The presence of hydrogen serves to reduce the formation of coke which tends to poison the catalyst. Hydrogen is preferably introduced into the reforming reaction at a rate varying from 0 to about 20 mols of hydrogen per mol of feed. The hydrogen can be in admixture with light gaseous hydrocarbons.

If, after a period of operation, the catalyst has become deactivated by the presence of carbonaceous deposits, said deposits can be removed from the catalyst by passing an oxygen-containing gas, such as dilute air, into contact with the catalyst at an elevated temperature in order to burn the carbonaceous deposits from the catalyst. The regeneration can be performed either in the semiregenative mode in which the reforming operation is interrupted after a more or less long period of time and catalyst regeneration is carried out, or in the onstream regenerative mode, in which a portion of the catalyst is regenerated while the reforming operation is continued over the remainder of the catalyst. Two types of onstream regeneration are known in the prior art, cyclic and continuous reforming. In cyclic reforming, the catalyst in one of a series of reactors is regenerated while reforming is continued in the rest of the plant. In continuous reforming, a portion of deactivated catalyst is removed from the plant, regenerated in a separate regeneration system while reforming is continued in the plant, and the regenerated catalyst is returned to the plant. The method of regenerating the catalyst will depend on whether there is a fixed bed, moving bed, or fluidized bed operation. Regeneration methods and conditions are well known in the art.

The following Example illustrates the advantages which can be obtained using the catalyst of the present invention. The Example will also serve to suggest modifications which can be made without departing from the scope of the invention to achieve equivalent benefits to those exemplified.

EXAMPLE

Two powdered reforming catalysts were prepared by impregnating a large-pore zeolite, L-zeolite, with platinum and molybdenum. They both comprised 0.8% platinum and 0.033% molybdenum (a platinum to molybdenum mole ratio of 12 to 1).

The first catalyst, catalyst "A", was prepared by (1) ion exchanging a potassium-type L-zeolite having crystal sizes of from about 1000 to 2000 Angstroms with a sufficient volume of 0.3 molar barium nitrate solution to contain an excess of barium compared to the ion exchange capacity of the zeolite; (2) drying the resulting barium-exchanged type L-zeolite catalyst; (3) calcining the catalyst at 590° C.; (4) impregnating the catalyst with 0.8% platinum using tetrammineplatinum (II) nitrate; (5) drying the catalyst; (6) calcining the catalyst at 260° C.; (7) impregnating the platinum containing catalyst with 0.033% molybdenum using ammonium molybdate, $(NH_4)_2MoO_4$; (8) drying the catalyst; and (9) reducing the catalyst in hydrogen at 480° C. to 500° C. for 1 hour.

The second catalyst, catalyst "B", was prepared by (1) impregnating unexchanged potassium-type L-zeolite with 0.033% molybdenum using $(NH_4)_2MoO_4$; (2) drying and calcining the catalyst; (3) impregnating the catalyst with 0.8% platinum using tetrammineplatinum (II) nitrate; (4) drying and calcining the catalyst; and (5) reducing the catalyst in hydrogen.

A third catalyst, catalyst "C" was used as a comparison. It was prepared like catalyst "A" but without adding the molybdenum.

Each catalyst was contacted with 0.2 ppm sulfur in normal hexane at 860° F., 100 psig, and a LHSV of 11. The first order rate constant for benzene formation was determined over the effective on-stream life of each catalyst and plotted against hours on-stream. The results are shown in the accompanying FIGURE.

Catalyst A showed lower starting activity than catalyst C. The Mo compound may have blocked access to the platinum. However, even at low conversion, deactivation did not follow the pattern set by the standard, catalyst C; rather catalyst A performed like standard, catalyst C, with no suflur, albeit at half the usual conversion.

The second Mo-containing catalyst, catalyst B, had initial activity approximately equal to catalyst C. However, unlike catalyst C, it deactivated extremely slowly between 20- and 55-hr onstream. Its conversion at 83-hr equalled the standard, catalyst C, conversion at 56-hr onstream under sulfiding conditions. If one compares the slope of the change in rate of SDP benzene production over time, for catalyst C between 35 and 58 hr onstream the slope is 1.31. For the Mo-containing catalyst B between 60- and 83-hr the slope is 0.73. Thus, even when deactivation begins to occur, it does so at about half the expected rate.

The full scope of the present invention is defined by the following claims and their equivalents.

What is claimed is:

1. A reforming catalyst comprising a large-pore zeolite selected from the group consisting of the potassium, sodium, rubidium, or cesium forms of zeolite L and at least one reforming catalytic metal selected from the group consisting of Group VIII noble metals, having enhanced sulfur tolerance achieved by adding at least one desulfurization metal.

2. A catalyst according to claim 1 wherein at least one of said desulfurization metals is selected from the group consisting of the Group VIB metals.

3. A catalyst according to claim 2 wherein at least one of said desulfurization metals is selected from the group consisting of molybdenum, chromium, and tungsten.

4. A catalyst according to claim 3 wherein at least one of said desulfurization metals is molybdenum.

5. A catalyst according to claim 1 wherein at least one of said catalytic metals is selected from the group consisting of platinum, palladium, and iridium.

6. A catalyst according to claim 5 wherein at least one of said catalytic metals is platinum.

7. A catalyst according to claim 1 wherein said large-pore zeolite is the potassium form of zeolite L.

8. A catalyst according to claim 1 wherein said desulfurization metal or metals are added in an amount sufficient to enhance the sulfur tolerance of said reforming catalyst without undesirably increasing the hydrocracking capacity of said catalyst.

9. A catalyst according to claim 8 wherein the mole ratio of catalytic metal or metals to desulfurization metal or metals in said catalyst ranges from about 50 to 1 to about 1 to 1.

10. A catalyst according to claim 9 wherein said mole ratio is from about 20 to 1 to about 5 to 1.

11. A catalyst according to claim 1 wherein said zeolite is impregnated with said desulfurization metal prior to being impregnated with said catalytic metal.

12. A catalyst according to claim 1 wherein said catalyst also comprises an inorganic oxide binder.

13. A catalyst according to claim 12 wherein said binder is selected from the group consisting of an aluminosilicate, alumina, and silica, in which acidic sites are exchanged by cations which do not impart strong acidity.

14. A catalyst according to claim 12 wherein said binder is alumina.

15. A catalyst according to claim 1 wherein an alkaline earth metal selected from the group consisting of barium, strontium, and calcium is present in said catalyst.

16. A reforming catalyst comprising a large-pore zeolite selected from the group consisting of the potassium, sodium, rubidium, or cesium forms of zeolite L impregnated with from about 0.1% to about 5% by weight platinum, having enhanced sulfur tolerance achieved by impregnating said zeolite with molybdenum, prior to impregnation with platinum, in an amount such that the mole ratio of platinum to molybdenum is about 12 to 1.

* * * * *